United States Patent
Murai et al.

(10) Patent No.: US 8,072,631 B2
(45) Date of Patent: Dec. 6, 2011

(54) IMAGE TRANSMISSION APPARATUS, DISPLAY APPARATUS AND METHOD

(75) Inventors: Shinya Murai, Kawasaki (JP); Hajime Yamaguchi, Kawasaki (JP); Tsuyoshi Hioki, Yokohama (JP); Shogo Yamaguchi, Kawasaki (JP); Mitsue Fujinuki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1349 days.

(21) Appl. No.: 11/526,241

(22) Filed: Sep. 25, 2006

(65) Prior Publication Data

US 2007/0263086 A1    Nov. 15, 2007

(30) Foreign Application Priority Data

Mar. 29, 2006 (JP) .................. 2006-91730

(51) Int. Cl.
  *G06F 3/12* (2006.01)
  *G09G 5/00* (2006.01)
  *G06F 13/00* (2006.01)
(52) U.S. Cl. ....... 358/1.15; 358/1.13; 345/2.3; 710/303; 710/304
(58) Field of Classification Search .......... 358/1.15, 358/1.13; 382/236, 239, 253; 345/2.3; 710/11, 710/303, 304
See application file for complete search history.

(56) References Cited

U.S. PATENT DOCUMENTS

| | | | | |
|---|---|---|---|---|
| 4,845,559 A | * | 7/1989 | Labit et al. ............... | 375/240.22 |
| 6,580,422 B1 | * | 6/2003 | Reilly ............................ | 345/169 |
| 6,897,833 B1 | * | 5/2005 | Robinson et al. .............. | 345/2.3 |
| 7,042,515 B2 | * | 5/2006 | Sung ............................. | 348/552 |
| 7,411,577 B2 | * | 8/2008 | Kim et al. ..................... | 345/156 |
| 2002/0109665 A1 | * | 8/2002 | Matthews et al. ............. | 345/156 |
| 2003/0025648 A1 | * | 2/2003 | Glen et al. ..................... | 345/2.3 |
| 2003/0025683 A1 | * | 2/2003 | Adler ............................. | 345/204 |
| 2003/0083036 A1 | * | 5/2003 | Liu ................................ | 455/343 |
| 2003/0088621 A1 | * | 5/2003 | Martinez et al. .............. | 709/204 |
| 2003/0088879 A1 | * | 5/2003 | Martinez et al. .............. | 725/110 |
| 2003/0088880 A1 | * | 5/2003 | Martinez et al. .............. | 725/133 |
| 2003/0093568 A1 | * | 5/2003 | Deshpande .................... | 709/247 |
| 2004/0017519 A1 | * | 1/2004 | Sung ............................. | 348/836 |
| 2004/0198430 A1 | * | 10/2004 | Moriyama et al. ......... | 455/556.1 |
| 2004/0235532 A1 | * | 11/2004 | Matthews et al. ............. | 455/566 |
| 2005/0013103 A1 | * | 1/2005 | Chandley ...................... | 361/683 |
| 2005/0017946 A1 | * | 1/2005 | Park .............................. | 345/156 |
| 2005/0020319 A1 | * | 1/2005 | Kim et al. ..................... | 455/566 |
| 2007/0143517 A1 | * | 6/2007 | Matthews et al. ............. | 710/303 |
| 2008/0151130 A1 | * | 6/2008 | Van Gassel et al. .......... | 348/791 |
| 2010/0082868 A9 | * | 4/2010 | Matthews et al. ............. | 710/303 |

FOREIGN PATENT DOCUMENTS

| | | |
|---|---|---|
| JP | 2002-304283 | 10/2002 |
| JP | 2004-86550 | 3/2004 |

* cited by examiner

*Primary Examiner* — King Poon
*Assistant Examiner* — Vincent Peren
(74) *Attorney, Agent, or Firm* — Nixon & Vanderhye, P.C.

(57) ABSTRACT

There is provided with a method performed in an image transmission apparatus capable of executing first communication and second communication whose communication speed is lower than that of the first communication with a display apparatus, including: generating an image to be displayed on the display apparatus; detecting whether the first communication is executable or not; transmitting the generated image to the display apparatus via the first communication when the first communication is executable; transmitting a compressed image obtained by compressing the generated image to the display apparatus via the second communication when the first communication is not executable; and transmitting compression utilization information required to display the compressed image on the display apparatus to the display apparatus via at least one of the first communication and the second communication when the first communication is executable.

7 Claims, 9 Drawing Sheets

IMAGE TRANSMISSION APPARATUS, DISPLAY APPARATUS AND METHOD

CROSS REFERENCE TO RELATED APPLICATIONS

This application is based upon and claims the benefit of priority from the prior Japanese Patent Application No. 2006-91730, filed on Mar. 29, 2006, the entire contents of which are incorporated herein by reference.

BACKGROUND OF THE INVENTION

1. Field of the Invention

The present invention relates to an image transmission apparatus which generates and transmits an image, a display apparatus which receives the image from the image transmission apparatus and displays the received image, and a method to be performed in these apparatuses.

2. Related Art

In JP-A 2002-304283 (KOKAI), there is described an example of a system in which an information processing apparatus (image transmission apparatus) and a display apparatus can be connected via multiple communication paths. When the information processing apparatus and the display apparatus are wiredly connected, the system according to JP-A 2002-304283 (KOKAI) transmits an image to be displayed on the display apparatus via the wired connection. When detecting that the wired connection has been cut, the system transmits the image to be displayed on the display apparatus via wireless connection.

Thereby, when using the display apparatus near the information processing apparatus, a user can work with a high graphic performance via wired connection. Furthermore, it is also possible to perform work using the display apparatus away from the information processing apparatus, and in this case, the display apparatus receives an image to be displayed from the information processing apparatus via wireless connection.

As a scheme for compressing and transmitting information to be displayed on the display apparatus, there is widely used a scheme in which a whole image as an image of one frame to be displayed on the display apparatus is transmitted first, and then an image of an area where change has been made is transmitted at predetermined time intervals (see JP-A 2004-86550 (KOKAI)).

When this scheme is applied to the system of JP-A 2002-304283 (KOKAI), the whole image to be displayed must be transmitted first immediately after switching to transmission via wireless communication, and a lot of time is required for the transmission when the usable band is narrow. Furthermore, since update of the displayed image starts after the whole image has been transmitted, a lot of time is required until the screen display is started.

SUMMARY OF THE INVENTION

According to an aspect of the present invention, there is provided with an image transmission apparatus comprising:
a first communication unit configured to perform first communication with a display apparatus;
a detector configured to detect whether the first communication is executable or not;
a second communication unit configured to perform second communication by a communication speed lower than that of the first communication with the display apparatus;
an image generation unit configured to generate images to be displayed on the display apparatus;
a first image control unit configured to transmit the images generated by the image generation unit to the display apparatus via the first communication unit when the first communication is executable;
a second image control unit configured to transmit compressed images obtained by compressing the images generated by the image generation unit to the display apparatus via the second communication unit when the first communication is not executable; and
an information transmission unit configured to transmit compression utilization information required to display the compressed images on the display apparatus to the display apparatus via at least one of the first communication unit and the second communication unit, when the first communication is executable.

According to an aspect of the present invention, there is provided with a display apparatus comprising:
a first communication unit configured to perform first communication with an image transmission apparatus transmitting images;
a detector configured to detect whether the first communication is executable or not;
a second communication unit configured to perform second communication by a communication speed lower than that of the first communication with the image transmission apparatus;
an image storage configured to store an image to be displayed;
a display unit configured to display the image in the image storage;
a first image processor configured to receive an image from the image transmission apparatus via the first communication unit and write the received image into the image storage, when the first communication is executable;
a second image processor configured to perform image writing for the image storage with the use of a compressed image received from the image transmission apparatus via the second communication unit, when the first communication is not executable; and
an information reception unit configured to receive compression utilization information required to start the image writing by the second image processor from the image transmission apparatus via at least one of the first communication unit and the second communication unit, when the first communication is executable.

According to an aspect of the present invention, there is provided with a method performed in an image transmission apparatus capable of executing first communication and second communication whose communication speed is lower than that of the first communication with a display apparatus, comprising:
generating an image to be displayed on the display apparatus;
detecting whether the first communication is executable or not;
transmitting the generated image to the display apparatus via the first communication when the first communication is executable;
transmitting a compressed image obtained by compressing the generated image to the display apparatus via the second communication when the first communication is not executable; and
transmitting compression utilization information required to display the compressed image on the display apparatus to the display apparatus via at least one of the first communication and the second communication when the first communication is executable.

DETAILED DESCRIPTION OF THE INVENTION

An embodiment of the present invention will be described based on drawings.

Figure 1:
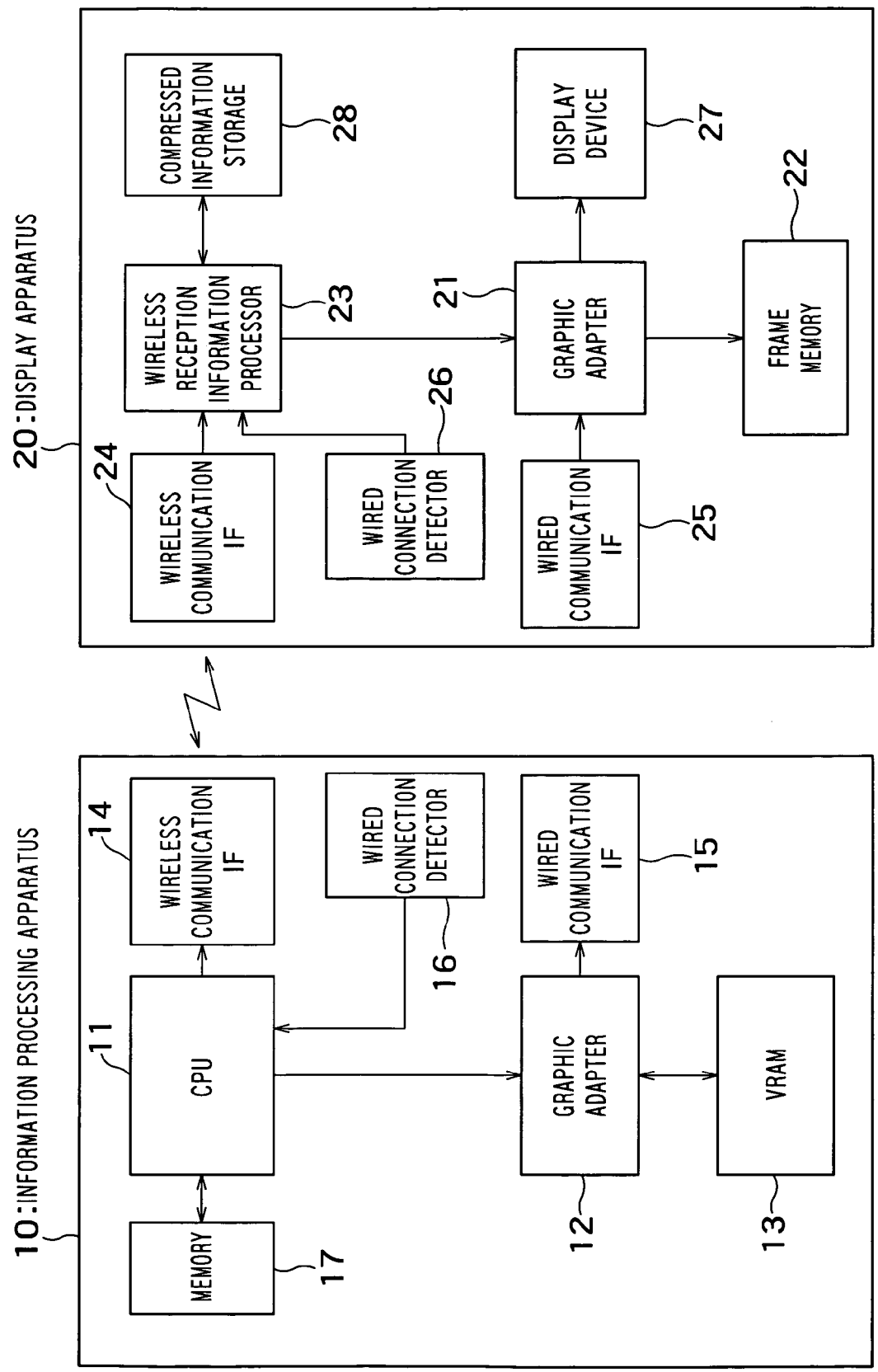
FIG. 1 shows the configuration of an information processing apparatus and a display apparatus according to an embodiment of the present invention.

FIG. 1 is a block diagram showing the configuration of an information processing apparatus (image transmission apparatus) and a display apparatus according to the embodiment of the present invention.

The information processing apparatus 10 is provided with a CPU 11, a graphic adapter 12, a VRAM (video random access memory) 13, a wireless communication IF 14, a wired communication IF 15, a wired connection detector 16 and a memory 17. On the CPU 11, an operating system (OS) operates, and on the OS, application programs operate. Programs such as the OS and the application programs are stored in the memory 17. The CPU 11 corresponds to an image generation unit, a second image control unit and an information transmission unit. The graphic adapter 12 corresponds to a first image control unit. The memory 17 corresponds to an image storage. The wired communication IF 15 corresponds to a first communication unit. The wireless communication IF 14 corresponds to a second communication unit.

The display apparatus 20 is provided with a graphic adapter 21, a frame memory 22, a wireless reception information processor 23, a wireless communication IF 24, a wired communication IF 25, a wired connection detector 26, a display device 27 and a compressed information storage 28. The frame memory 22 corresponds to an image storage. The display device 27 corresponds to a display unit. The graphic adapter 21 corresponds to a first image processor. The wireless reception information processor 23 corresponds to an information reception unit and a second image processor. The compressed information storage 28 corresponds to an tion unit. The wired communication IF 25 corresponds to a first communication unit. The wireless communication IF 24 corresponds to a second communication unit.

The information processing apparatus 10 and the display apparatus 20 performs wired communication (first communication) via a wired communication path (first communication path) between the wired communication IF 15 and the wired communication IF 25. The information processing apparatus 10 and the display apparatus 20 may be directly connected via a connector or may be connected via a cable. The information processing apparatus 10 and the display apparatus 20 also performs wireless communication (second communication) via a wireless communication path (second communication path) between the wireless communication IF 14 and the wireless communication IF 24. The information processing apparatus 10 and the display apparatus 20 are always capable of performing wireless communication when they are operating, irrespective of the connection condition (irrespective of whether they are connected or disconnected). While the information processing apparatus 10 and the display apparatus 20 are connected with each other, an image is transmitted from the information processing apparatus 10 to the display apparatus 20 via a wired communication path, and the transmitted image is displayed on the display apparatus 20 (a wired-communication-path-used image transfer mode). On the other hand, while the information processing apparatus 10 and the display apparatus 20 are disconnected from each other, a compressed image is transmitted from the information processing apparatus 10 to the display apparatus 20 via a wireless communication path, and displaying is performed based on the transmitted compressed image (a wireless-communication-path-used image transfer mode). One of the characteristics of this embodiment is that, while the wired-communication-path-used image transfer mode is being executed, information (compression utilization information) required for starting display (writing) of a compressed image on the display apparatus is transmitted to the display apparatus via a wireless communication path or a wired communication path. Thereby, when the information processing apparatus 10 and the display apparatus 20 are disconnected from each other, and the wireless-communication-path-used image transfer mode is started, display and update of display can be quickly performed because transmission of the compression utilization information is already carried out.

Figure 6:
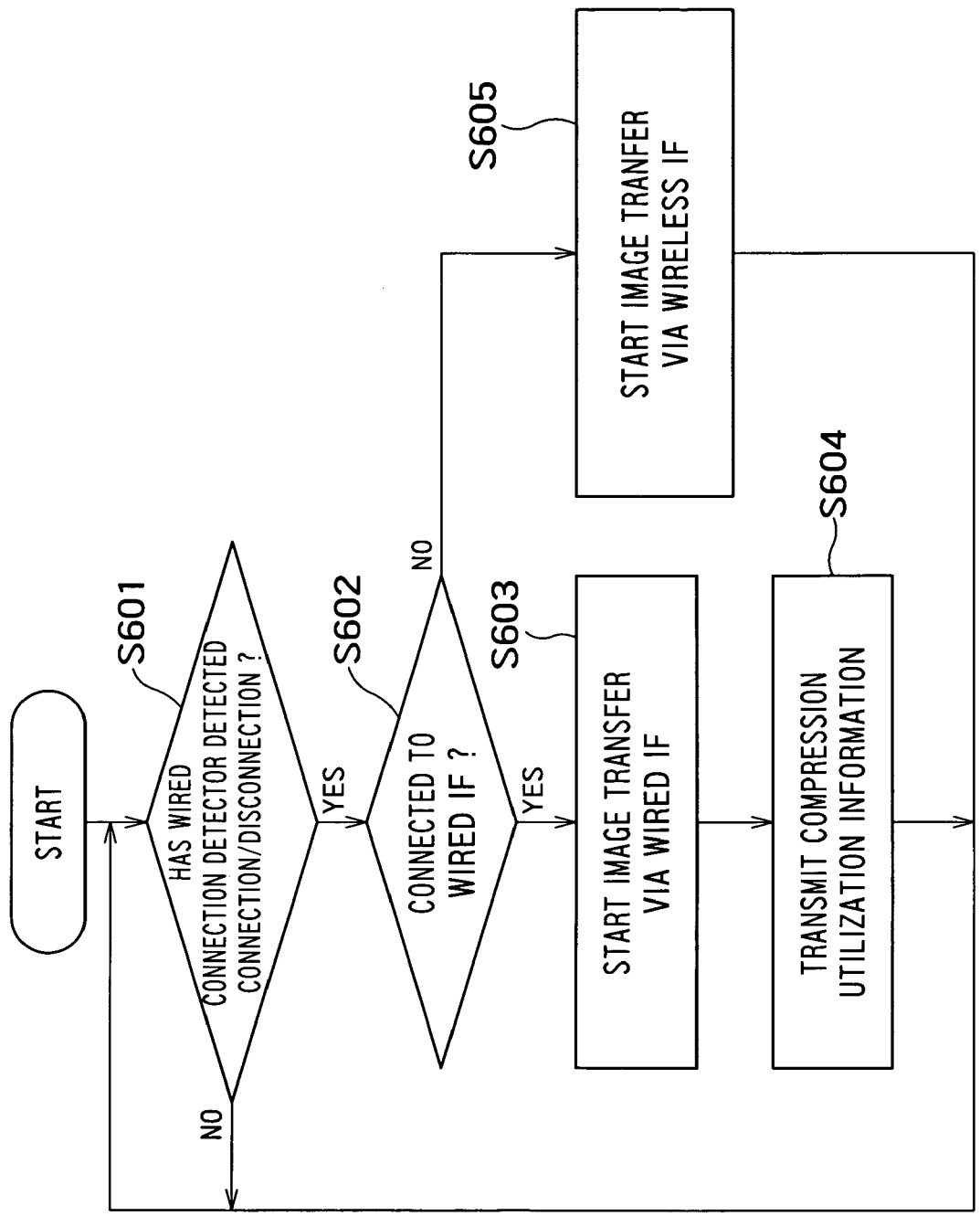
FIG. 6 is a flowchart illustrating a procedure for switching between a wired-communication-path-used image transfer mode and a wireless-communication-path-used image transfer mode.

FIG. 6 is a flowchart illustrating a procedure for switching between the wired-communication-path-used image transfer mode and the wireless-communication-path-used image transfer mode.

When the information processing apparatus 10 is connected to the display apparatus 20 (or a wire cable connected to the display apparatus) at the wired communication IF 15, the wired connection detector 16 of the information processing apparatus 10 detects that the display apparatus 20 has been connected to the wired communication IF 15 (S601: YES; S602: YES). That is, it detects that wired communication (first communication) is executable. This detection may be performed, for example, by providing a switch for detecting whether or not a connector is connected to the wired communication IF 15 or by receiving a signal from the display apparatus 20, at the wired communication IF 15. Meanwhile, at the display apparatus 20 also, when the information processing apparatus 10 is connected to the wired communication IF 25, the wired connection detector 26 detects it. That is, it detects that wired communication (first communication) is executable. It is assumed that detection of connection is also performed at a time of start-up of the information processing apparatus 10 and the display apparatus 20.

If it is detected that the display apparatus 20 has been connected at the wired communication IF 15, the CPU 11 in the information processing apparatus 10 determines to execute the wired-communication-path-used image transfer mode (S603). At the display apparatus 20 also, when it is detected that the information processing apparatus 10 has been connected to the wired communication IF 25, the wireless reception information processor 23 determines to execute the wired-communication-path-used image transfer mode (S603).

When it is determined to execute the wired-communication-path-used image transfer mode, the CPU 11 requests the graphic adapter 12 to carry out rendering (drawing) in accordance with an operation result of a program. The graphic adapter 12 writes an image corresponding to the rendered content into the VRAM 13. Furthermore, the graphic adapter 12 periodically reads an image from the VRAM 13 and passes it to the wired communication IF 15. The wired communication IF 15 converts the passed image to a signal format which can be transmitted via a wired communication path and transmits it to the display apparatus 20. As examples of the wired communication IF 25, there are, for example, a DVI (digital visual interface) interface and an analog RGB interface. The wired communication IF 25 in the display apparatus 20 receives an image from the information processing apparatus 10 and writes the received image into the frame memory 22 via the graphic adapter 21. The graphic adapter 21 periodically reads the image written in the frame memory 22 and displays it on the display device 27.

Figure 2:
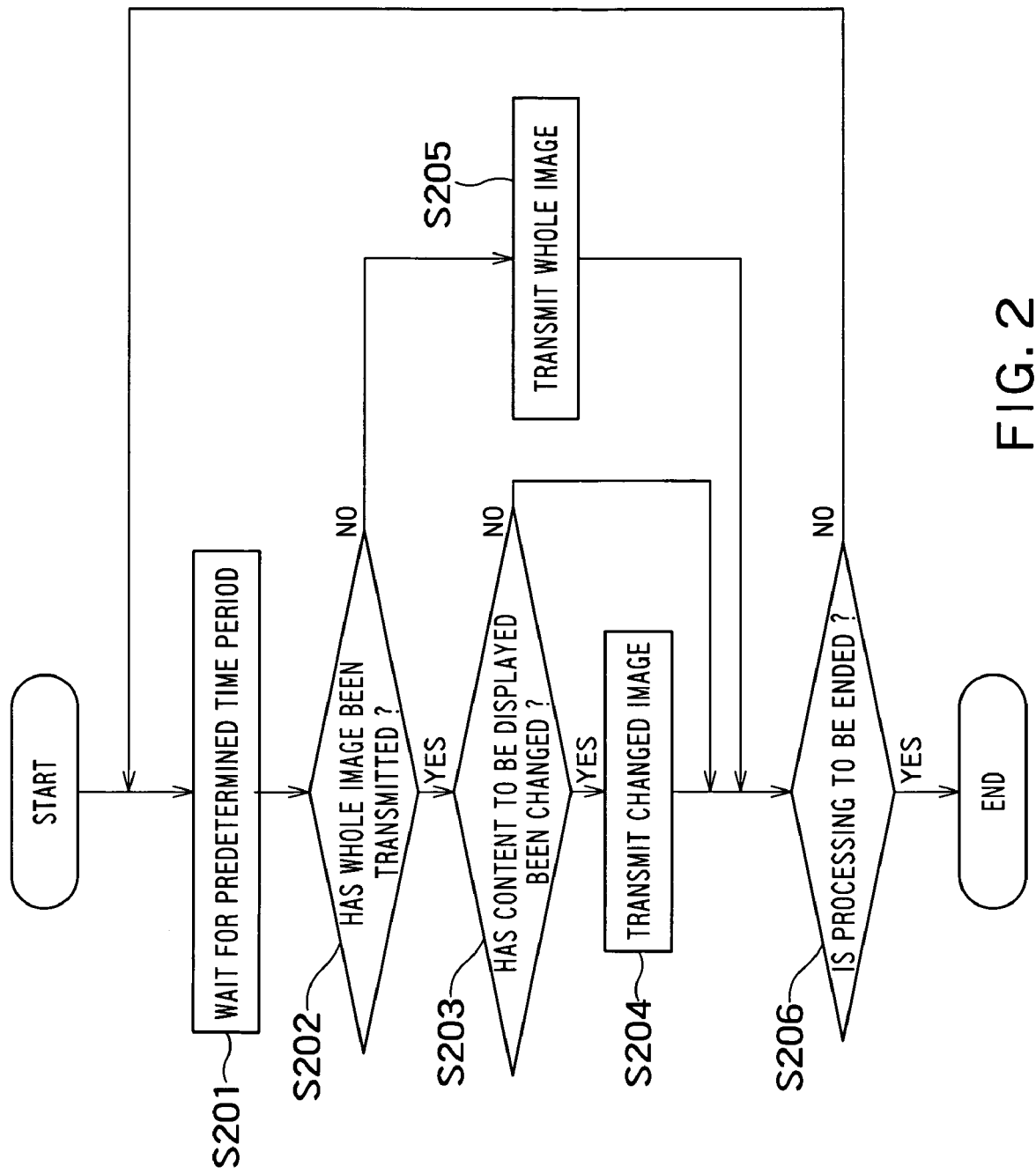
FIG. 2 is a flowchart illustrating a procedure to be executed in the information processing apparatus when the information processing apparatus is connected to the display apparatus.

Meanwhile, the CPU 11 in the information processing apparatus 10 transmits compression utilization information via the wireless communication IF 14 (the information may be transmitted via the wired communication IF 15) (S604). More specifically, when the information processing apparatus 10 is connected to the display apparatus 20, the procedure in FIG. 2 is executed. This procedure is on the assumption of the following compression transmission scheme. That is, a whole image which is an image of one frame to be displayed on the display apparatus 20 is transmitted first, and after that, an image of an area where change has been made is transmitted, with position information indicating the position in the entire screen of the display apparatus 20 (for example, a block number, coordinates of the changed area and the like) included. There are some methods for implementing a program for performing this scheme, which will be described later. The image of the area where change has been made (including the position information) is hereinafter referred to as a changed image.

As shown in FIG. 2, after waiting for a predetermined time period (S201), the CPU 11 in the information processing apparatus 10 checks whether the whole image has already been transmitted (S202). When the whole image has already been transmitted to the display apparatus 20 (S202: YES), then it is checked whether or not the content to be displayed on the display apparatus 20 has been changed from the content already transmitted (S203). If the content has been changed from the content already transmitted (S203: YES), then the changed image (which may be encoded) is transmitted via the wireless communication IF 14 (S204). If the whole image has not been transmitted yet at S202 (S202: NO), then the CPU 11 transmits the whole image (which may be encoded) via the wireless communication IF 14 (S205). If it is detected that the display apparatus 20 is connected to the wired communication IF 15 when it is started-up, a desktop screen immediately after login may be transmitted as the whole image. After transmitting the whole image, after transmitting a changed image at S204, or in the case where there is no change in the content to be described at S203 (S203: NO), the CPU 11 checks whether an end instruction has been inputted by a user (5206). If the end instruction has not been inputted (S206: NO), then the CPU 11 returns to S201. If the end instruction has been inputted (5206: YES), then the CPU 11 ends the processing. Every time the information processing apparatus 10 transits from the state of being disconnected from the display apparatus 20 to the state of being connected therewith, the procedure in FIG. 2 is reset once and started again from the beginning (in FIG. 6, S601: YES→S602: YES→S603). That is, every time the state switches from disconnection to connection, transmission of the whole image at S205 is performed.

While the procedure shown in FIG. 2 (S604 in FIG. 6) is being performed in the information processing apparatus 10, the wireless reception information processor 23 in the display apparatus 20 first receives the whole image transmitted from the information processing apparatus 10 and writes the received image (to be decoded if be encoded) into a frame buffer (not shown) in the compressed information storage 28. Then, the wireless reception information processor 23 receives a changed image transmitted after the whole image and writes (overwrites) the changed image it has received (to be decoded if be encoded) into the frame buffer in the compressed information storage 28. That is, the whole image is updated. The changed image transmitted from the information processing apparatus 10 includes range information indicating the coordinates to be displayed or a display range on the screen, in addition to information about the image itself.

When the display apparatus 20 is disconnected from the wired communication IF 15, the wired connection detector 16 in the information processing apparatus 10 detects that the display apparatus 20 has been disconnected from the wired communication IF 15 (S601: YES; S602: NO). At the same time, the wired connection detector 26 in the display apparatus 20 also detects that the information processing apparatus 10 has been disconnected from the wired communication IF 25.

When it is detected by the wired connection detector 16 that the display apparatus 20 has been separated from the information processing apparatus 10, the CPU 11 determines to execute the wireless-communication-path-used image transfer mode (S605). When it is determined to execute the wireless-communication-path-used image transfer mode, the graphic adapter 12 stops the processing of reading an image from the VRAM 13 and passing it to the wired communication IF 15. Incidentally, the CPU 11 may continue writing in the VRAM 13 via the graphic adapter 12. But, the CPU 11 continues the procedure in FIG. 2 (S604) which it has been performed in the wired-communication-path-used image transfer mode. That is, it continues transmission of a changed image.

Meanwhile, when it is detected by the wired connection detector 26 that the information processing apparatus 10 has been separated from the display apparatus 20, the wireless reception information processor 23 also determines to execute the wireless-communication-path-used image transfer mode (S605). The wireless reception information processor 23 writes the image in the frame buffer in the compressed information storage 28, into the frame memory 22 via the graphic adapter 21. Thereby, the entire frame memory 22 is updated. After the update, the wireless reception information processor 23 writes a changed image received via the wireless communication IF 24 not into the compressed information storage 28 but into the frame memory 22 via the graphic adapter 21 (Writing into the compressed information storage 28 is stopped). The changed image transmitted from the information processing apparatus 10 includes a display position and a display range on the screen in addition to information about the image itself. The graphic adapter 21 performs writing into the frame memory 22 based on the range information.

After that, if the display apparatus 20 is connected to the information processing apparatus 10 again, S604 (the procedure in FIG. 2) is executed again after the process of S601: YES→S602: Yes→S603 in FIG. 6. That is, a whole image is written in the frame buffer in the compressed information storage 28 first, and after that, a changed image is overwritten on this whole image.

According to the above procedure, when transitioning to the wireless-communication-path-used image transfer mode, the information processing apparatus 10 can quickly display an image on the display apparatus because transmission of a whole image has already been completed. Furthermore, all that has to be done is to transmit a changed image after transition to the mode, and therefore, image update also can be quickly performed.

Here, it is desirable to set the waiting time at S201 in FIG. 2 longer in the wired-communication-path-used image transfer mode in comparison with that in the wireless-communication-path-used image transfer mode. This is because, when image transfer via a wired communication path is performed, an image transmitted via a wireless communication path is not displayed, and it is not necessary to update a whole screen at a high frequency. The wirelessly used band can be saved by lengthening the waiting time.

In the wired-communication-path-used image transfer mode, the information processing apparatus and the display apparatus are usually arranged at a short distance, and therefore, the wireless communication IF 14 in the information processing apparatus 10 may lower the transmission power for wireless communication. Thereby, the power consumed by the information processing apparatus can be reduced.

Here, description will be made on three program implementation examples (first to third examples) for the CPU 11 performing S604 (at which a whole image is transmitted first, and then transmission of a changed image is continued) in FIG. 6.

Figure 3:
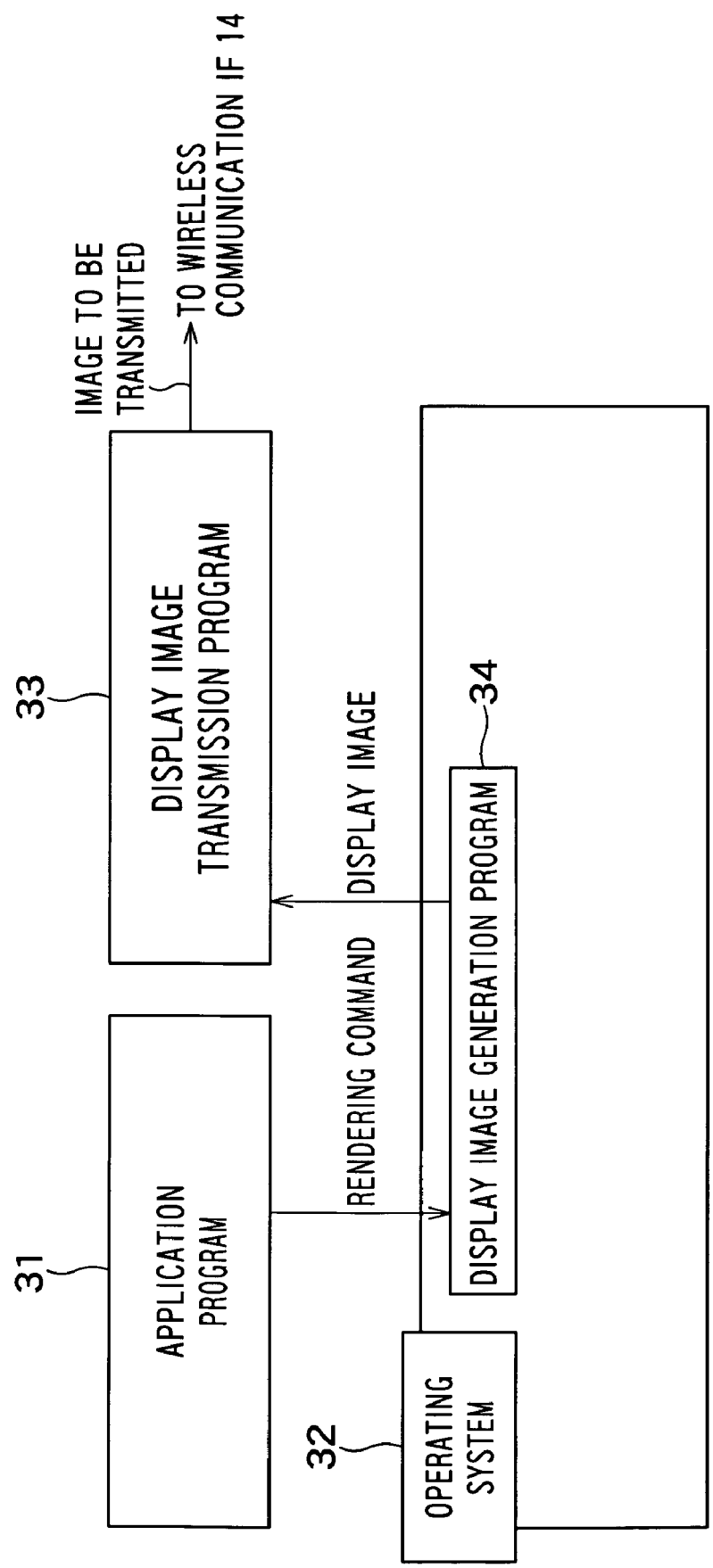
FIG. 3 shows a program implementation example 1 for executing S604.

FIG. 3 is a diagram illustrating the first example.

On the CPU 11, an application program 31, an operating system (OS) 32 and a display image transmission program 33 are operating. The operating system 32 includes a display image generation program 34. The display image generation program 34 generates an image to be displayed on the display apparatus 20. The display image transmission program 33 transmits the image generated by the display image generation program 34 to the display apparatus 20 via the wireless communication IF 14.

When S604 starts, the display image generation program 34 receives a whole image from the OS 32 and passes it to the display image transmission program 33. After that, when the application program 31 issues a rendering command to the OS 32, the display image generation program 34 in the OS 32 generates an image to be displayed on the display apparatus 20 based on the given rendering command and passes the generated image to the display image transmission program 33. The image passed here is the changed image described before. The display image transmission program 33 encodes the changed image and transmits it to the display apparatus 20 via the wireless communication IF 14.

Figure 4:
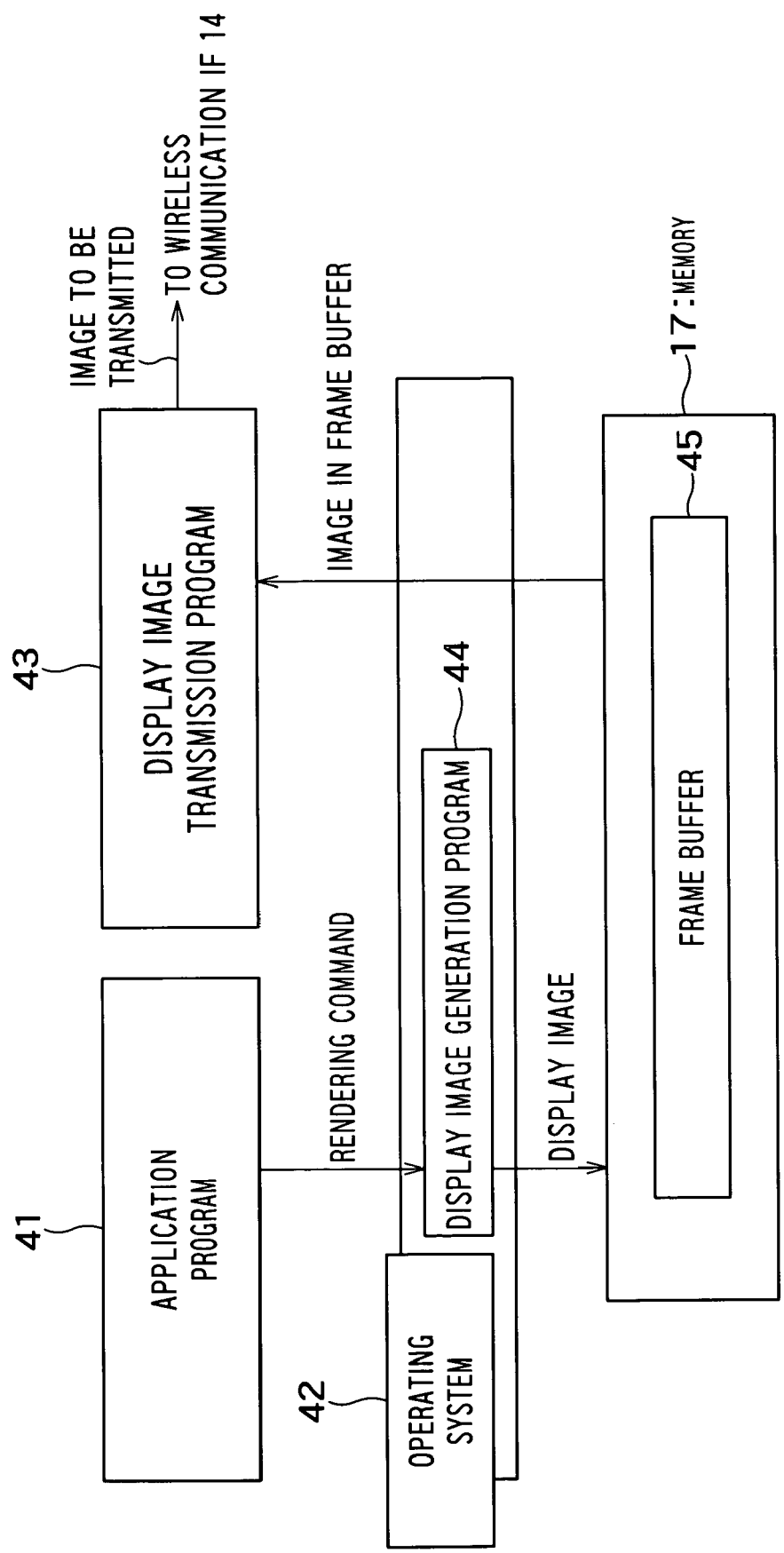
FIG. 4 shows a program implementation example 2 for executing S604.

FIG. 4 is a diagram illustrating the second example.

On the CPU 11, an application program 41, an operating system (OS) 42 and a display image transmission program 43 are operating. The OS 42 includes a display image generation program 44 which generates an image to be displayed on the display apparatus 20. The memory 17 includes a frame buffer 45 which retains an image generated by the display image generation program 44. When the application program 41 issues a rendering command to OS 42, the display image generation program 44 in the OS 42 generates an image to be displayed on the display apparatus 20 based on the given rendering command and writes the generated image into the frame buffer 45.

When S604 starts, the display image transmission program 43 acquires a whole image from the frame buffer 45, encodes it and transmits it to the display apparatus 20 via the wireless communication IF 14. The display image transmission program 43 also writes the transmitted whole image into a buffer (not shown) separately provided in the memory 17.

After that, the display image transmission program 43 compares the frame buffer 45 and the separately provided buffer described above, extracts a changed image, encodes it and transmits it to the display apparatus 20 via the wireless communication IF 14, at timing when the frame buffer 45 is updated or at predetermined time intervals. The display image transmission program 43 also writes the changed image into the above separately provided buffer.

Figure 5:
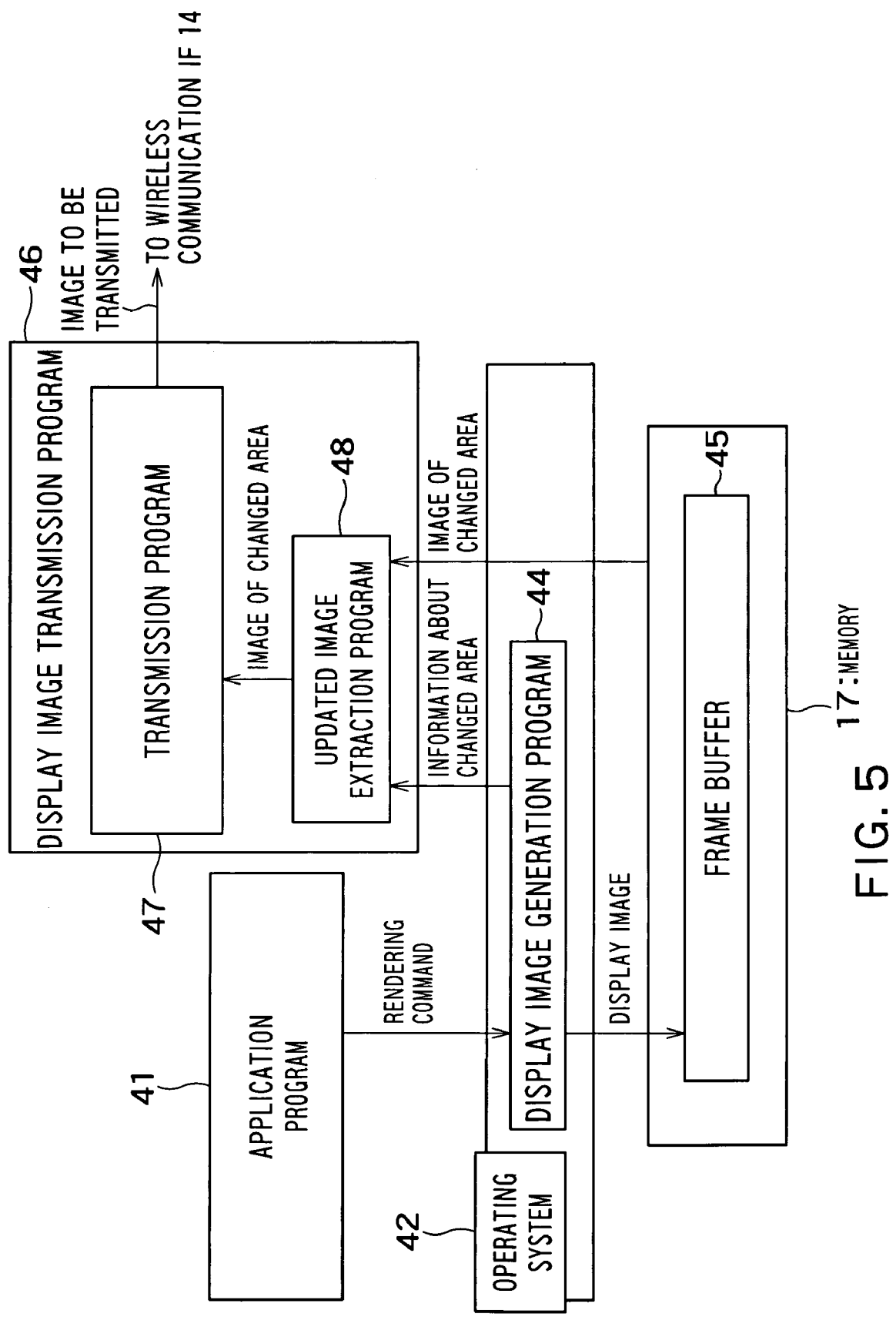
FIG. 5 shows a program implementation example 3 for executing S604.

FIG. 5 is a diagram illustrating the third example. In FIG. 5, the same reference numerals are attached to the same portions as in FIG. 4, and detailed description of the same portions will be omitted except description about extended processing.

In this third example, the process performed till the display image generation program 44 writes an image to be displayed on the display apparatus 20 into the frame buffer 45 is the same as FIG. 4. When generating an image based on a rendering command, the display image generation program 44 notifies area information about the generated image (area information about a changed image) to an updated image extraction program 48 in a display image transmission program 46. This notification may be made every time an image is generated. Alternatively, after generation of some images, the areas of these images may be collectively notified. The updated image extraction program 48 acquires a changed image from the frame buffer 45 based on the notified area information, and passes the changed image to a transmission program 47 in the display image transmission program 46. The transmission program 47 encodes the changed image and transmits it to the display apparatus 20 via the wireless communication IF 14.

In the second and third examples described with the use of FIGS. 4 and 5, an image is written into the frame buffer 45 in the memory 17, and this image is used. Instead, similar processing may be performed with the use of the image stored in the VRAM 13. Thereby, the necessity of the frame buffer 45 is eliminated, and the memory capacity can be reduced.

In the above description, as the scheme for compression transmission of an image via a wireless communication path, a scheme has been described in which a whole image to be displayed on a display apparatus is transmitted first, and then an image of an area where change has been made is transmitted. However, it is also possible to transmit not the image of an area where change has been made but difference between the changed image and the image before being changed. In this case, the display apparatus does not perform overwriting on the compressed information storage 28 or the frame memory 22 but adds the difference to the image stored in the frame buffer or the frame memory 22.

Another compression transmission scheme described below may be used instead of the compression transmission scheme described above.

Figure 9:
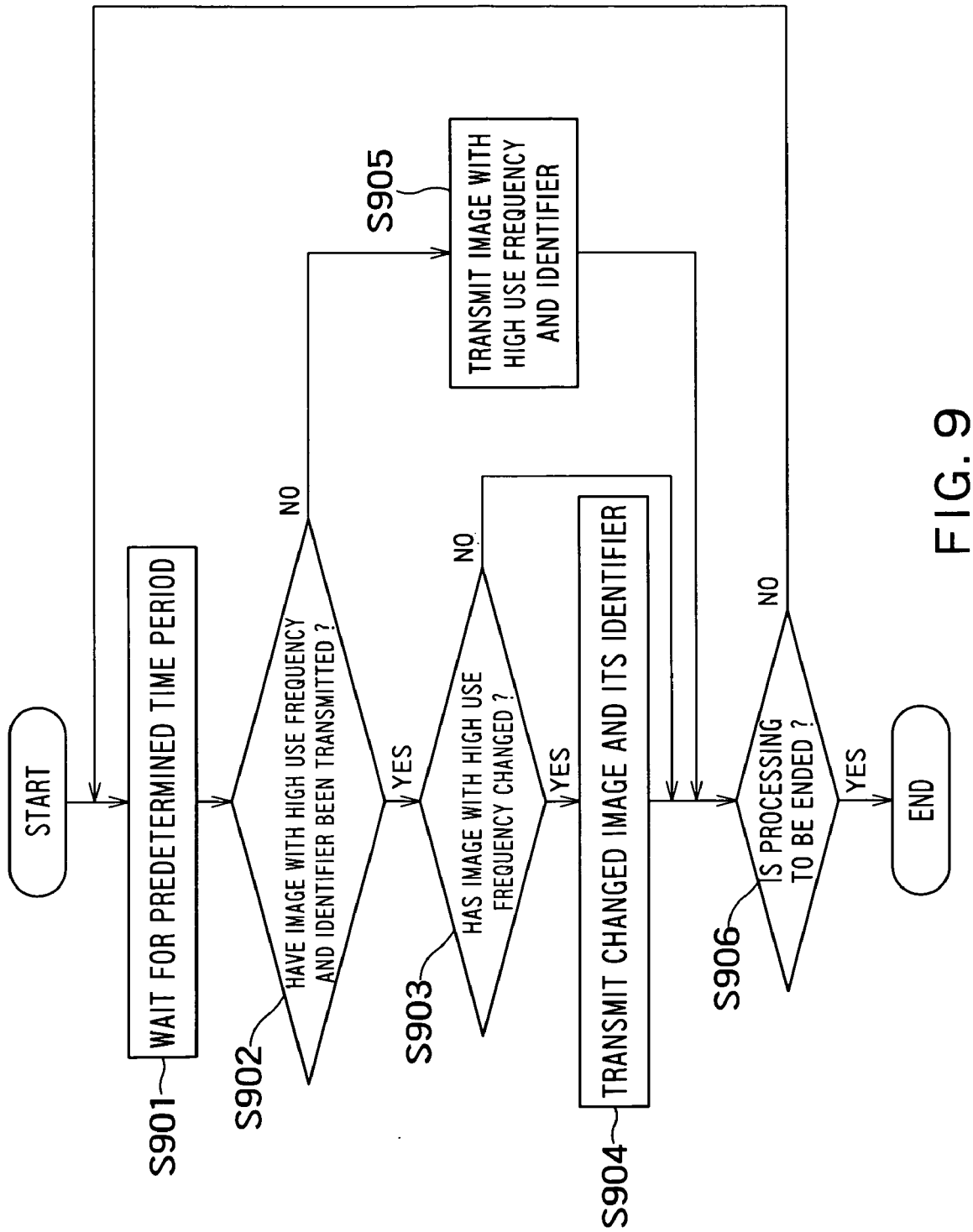
FIG. 9 is a flowchart illustrating a compression transmission scheme in which an image cache section is used.

FIG. 9 is a flowchart illustrating other compression transmission scheme different from that described above.

In this compression transmission scheme, an image (here, a partial image as a part of a whole image) used at a high frequency and the identifier of this image are transmitted to the display apparatus as compression utilization information. In the case of image transfer using a wireless path, if an image to be transmitted is retained on the display side, the identifier of this image and the area information for displaying this image are transmitted instead of transmitting this image. First, the CPU 11 checks, in the wired-communication-path-used image transfer mode, whether or not an image with a high use frequency and its identifier have been transmitted, every time after it waits for a predetermined time period (S901). If they have not been transmitted (S902: NO), then the CPU transmits them (S905). The display apparatus 20 stores this image with a high use frequency and its identifier (compression utilization information) in an image cache section (not shown) in the compressed information storage 28. If they have already been transmitted (S902: YES), then it is checked whether or not the image with a high use frequency has changed (S903). If it has changed (S903: YES), then the changed image and its identifier are transmitted (S904). The changed image and its identifier are also written in an image cache section (not shown) in the memory 17. After S905 and S904, if an end instruction is inputted by a user (S906: YES), then the CPU 11 ends the processing. Otherwise (S906: NO), then the CPU 11 returns to S901. As described above, by having transmitted an image with a high use frequency and its identifier in association with each other to the display apparatus 20, it is possible to quickly display and update an image when starting image transfer via a wireless path. Description will be made below on processing performed in the information processing apparatus and the display apparatus 20 in the case where image display via a wireless path is started.

Figure 7:
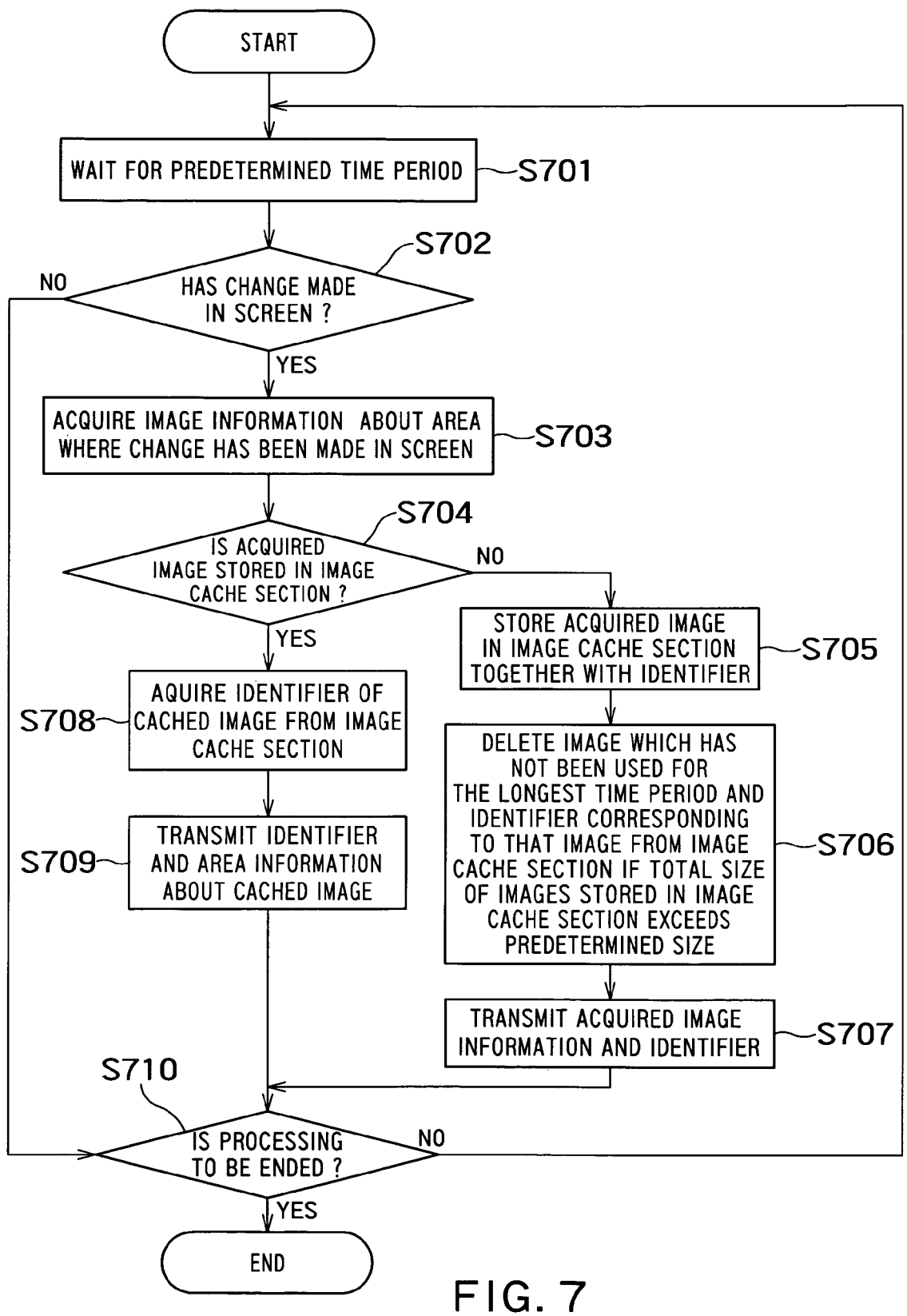
FIG. 7 is a flowchart illustrating a procedure for processing performed in the information processing apparatus.

FIG. 7 is a flowchart illustrating a flow of processing performed in the information processing apparatus 10.

The CPU 11 checks whether or not any change has been made in the screen (whole image) at regular time intervals (S701 and S702). If there is any change (S702: YES), then it acquires image information (including an image (a partial image) and area information) about an area in the screen where the change has been made (S703). Then, the CPU 11 checks whether or not the image of the acquired image information is stored in the image cache section (not shown) in the memory 17 (S704). If it is not stored (S704: NO), then the CPU 11 provides an identifier for the image included in the acquired image information and stores it in the image cache section in the memory 17 (S705). In this case, if the total size of images stored in the image cache section exceeds a predetermined size, then an image which has not been used for the longest time and an identifier corresponding to the image are deleted from the image cache section (S706). After that, the CPU 11 transmits the acquired image information and identifier to the display apparatus 20 via the wireless communication IF 14 (S707). On the other hand, if the image in the acquired image information is stored in the image cache section at S704 (S704: YES), then the CPU 11 acquires the identifier of the cached image from the image cache section (S708) and transmits the acquired identifier and the area information included in the image information to the display apparatus 20 (S709). If there is no change in the screen at S702 (S702: NO), or after S709 or S707, the CPU 11 checks whether or not an end instruction has been inputted from a user (S710). If it has not been inputted (S710: NO), then the CPU 11 returns to S701. If it has been inputted (S710: YES), then the CPU 11 ends the processing.

Figure 8:
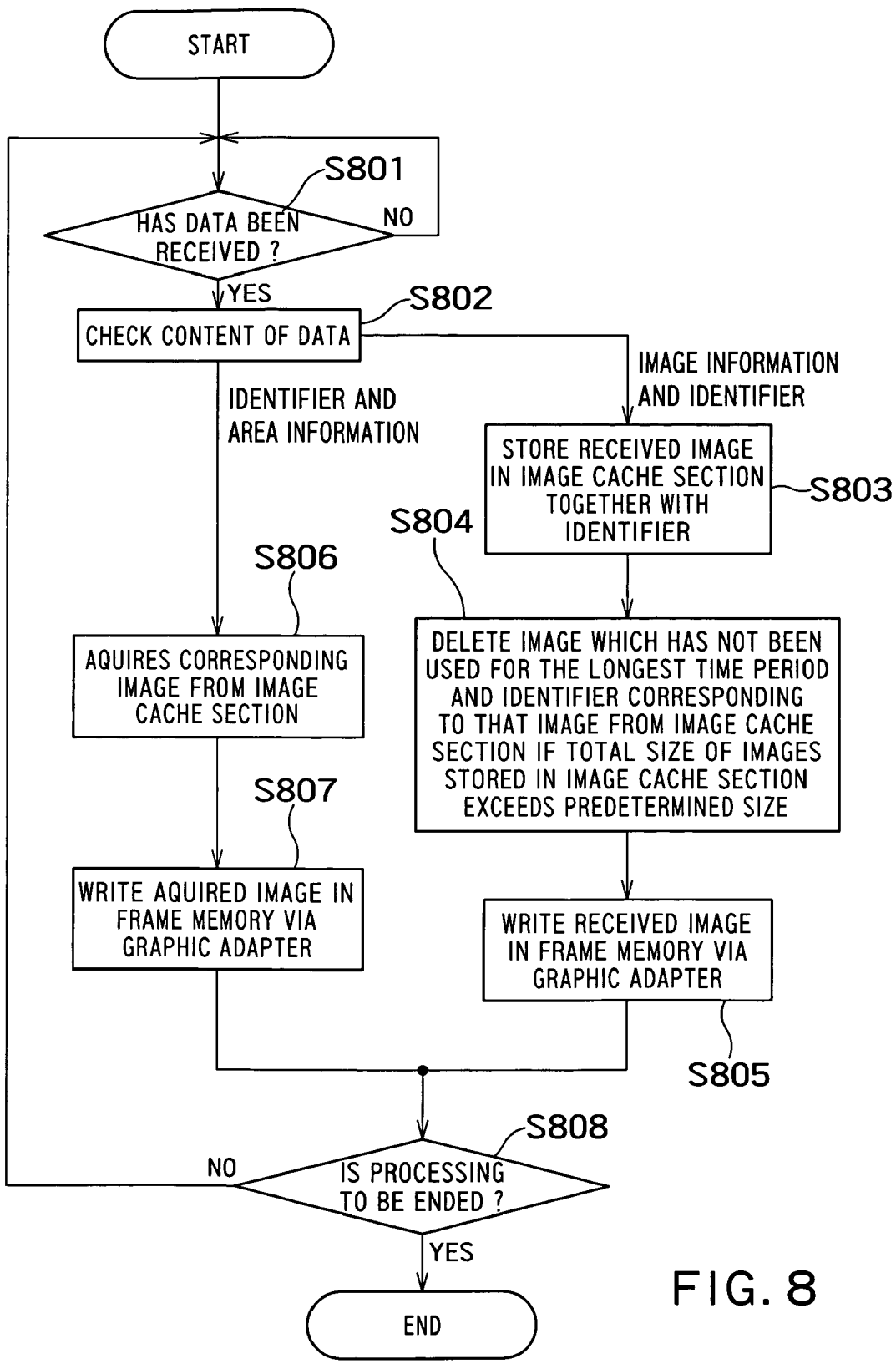
FIG. 8 is a flowchart illustrating a procedure for processing performed in the display apparatus.

FIG. 8 is a flowchart illustrating a flow for processing performed in the display apparatus 20.

The wireless reception information processor 23 waits for receiving of data from the information processing apparatus 10 via the wireless communication IF 24 (S801: NO). If data is received (S801: YES), then the content of the received data is checked (S802). If image information (an image (a partial image) and area information) and an identifier are received, the image included in the received image information and the identifier are stored in the image cache section (not shown) in the compressed information storage 28 (S803). In this case, if the total size of images stored in the image cache section exceeds a predetermined size, then an image which has not been used for the longest time and an identifier corresponding to the image are deleted from the image cache section (S804). The wireless reception information processor 23 writes the image in the received image information into the frame memory 22 via the graphic adapter 21, based on the area information included in the image information (S805). Meanwhile, if the content of the received data is an identifier and area information, then an image corresponding to the identifier is acquired from the image cache section (not shown) in the compressed information storage 28 (S806), and the acquired image is written into the frame memory 22 via the graphic adapter 21, based on the area information (S807). After S805 or S807, it is checked whether or not an end instruction has been inputted from a user, the information processing apparatus or the like (S808). If it has not been inputted (S808: NO), then the wireless reception information processor 23 returns to S801. If it has been inputted (S808: YES), then the wireless reception information processor 23 ends the processing.

As a scheme other than the compression transmission scheme described above, a scheme can be used in which compression transmission is performed with the use of vector quantization. In this case, in the wired-communication-path-used image transfer mode, a code book (defining correspondence between vector quantization codes and images) is transmitted from the information processing apparatus 10 to the display apparatus 20 as compression utilization information via a wired communication path or a wireless communication path and stored in a compression information storage 28 of the display apparatus 20. When the wireless-communication-path-used image transfer mode is started, the CPU 11 in the information processing apparatus 10 calculates vector quantization codes from an image (here, i.e. whole image) to be transmitted and transmits the calculated vector quantization code to the display apparatus 20 via a wireless IF. In the display apparatus, an image to be displayed is acquired based on the received vector quantization codes and the above code book, and the acquired image is written into the frame memory 22. Thereby, it is possible to quickly display and update an image.

In the above description, wired communication is assumed as first communication, and wireless communication is assumed as second communication, as an example. However, broadband wireless communication such as UWB communication may be used as the first communication, and a wired LAN (local area network) communication may be used as the second communication.

What is claimed is:

1. An image transmission apparatus comprising:
a first communication unit configured to perform first communication with a display apparatus;
a detector configured to detect whether the first communication is executable or not;
a second communication unit configured to perform second communication by a communication speed lower than that of the first communication with the display apparatus;
an image generation unit configured to generate images to be displayed on the display apparatus;

a first image control unit configured to transmit the images generated by the image generation unit to the display apparatus via the first communication unit when the first communication is executable;

a second image control unit configured to transmit compressed images obtained by compressing the images generated by the image generation unit to the display apparatus via the second communication unit when the first communication is not executable; and an information transmission unit configured to transmit compression utilization information required to display the compressed images on the display apparatus to the display apparatus via the second communication unit, when the first communication is being executed, wherein the information transmission unit first transmits a whole image of one frame as the compression utilization information when the first communication is being executed and then, if any change is made in the whole image, further transmits an image of an area in the whole image where the change has been made, and the second image control unit transmits, after the first communication becomes not executable, an image of an area where change has been made in the whole image, as the compressed image.

2. The apparatus according to claim 1, wherein
the information transmission unit transmits, as the image of an area in the whole image where the change has been made, information about difference from an image of the area before the change.

3. The apparatus according to claim 1, further comprising:
an image detector configured to detect an image from images generated by the image generation unit based on a use frequency;
an identifier giving unit configured to give an identifier to the detected image; and
an image storage configured to store the detected image and the identifier in association with each other as correspondence information; wherein
the information transmission unit transmits the correspondence information in the image storage as the compression utilization information; and
if an image to be transmitted to the display apparatus is stored in the image storage, the second image control unit transmits the identifier of the image to be transmitted as the compressed image.

4. The apparatus according to claim 1, wherein
the information transmission unit transmits a code book defining correspondence between vector quantization codes and images, as the compression utilization information; and
the second image control unit transmits a vector quantization code obtained by vector-quantizing an image to be transmitted to the display apparatus as the compressed image.

5. The apparatus according to claim 1, wherein the first communication is wired communication, and the second communication is wireless communication.

6. The apparatus according to claim 1, wherein, when the first communication is executable, the second communication unit makes transmission power lower than when the first communication is not executable.

7. A method performed in an image transmission apparatus capable of executing first communication and second communication whose communication speed is lower than that of the first communication with a display apparatus, comprising:

generating an image to be displayed on the display apparatus;

detecting whether the first communication is executable or not;

transmitting the generated image to the display apparatus via the first communication when the first communication is executable;

transmitting a compressed image obtained by compressing the generated image to the display apparatus via the second communication when the first communication is not executable; and transmitting compression utilization information required to display the compressed image on the display apparatus to the display apparatus via the second communication when the first communication is being executed, wherein the transmitting of compression utilization information includes first transmitting a whole image of one frame as the compression utilization information when the first communication is being executed and then, if any change is made in the whole image, further transmitting an image of an area in the whole image where the change has been made, and the transmitting of a compressed image includes, after the first communication becomes not executable, an image of an area where change has been made in the whole image, as the compressed image.

* * * * *